(12) United States Patent
Rausch

(10) Patent No.: US 7,593,753 B1
(45) Date of Patent: Sep. 22, 2009

(54) BASE STATION ANTENNA SYSTEM EMPLOYING CIRCULAR POLARIZATION AND ANGULAR NOTCH FILTERING

(75) Inventor: Walter F. Rausch, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 700 days.

(21) Appl. No.: 11/184,700

(22) Filed: Jul. 19, 2005

(51) Int. Cl.
H04M 1/00 (2006.01)
(52) U.S. Cl. .................. 455/562.1; 455/13.3; 342/359; 342/360
(58) Field of Classification Search ................ 455/13.3, 455/19, 25, 63.4, 82, 83, 562.1, 575.5, 575.7, 455/561; 342/359, 361, 363, 365; 343/276.1, 343/751, 754, 756, 778, 824
See application file for complete search history.

(56) References Cited

U.S. PATENT DOCUMENTS

| 4,737,793 | A | * | 4/1988 | Munson et al. ............. 342/361 |
|---|---|---|---|---|
| 5,283,587 | A | * | 2/1994 | Hirshfield et al. ........... 342/372 |
| 5,532,706 | A | * | 7/1996 | Reinhardt et al. ........... 343/778 |
| 5,568,158 | A | * | 10/1996 | Gould ........................ 343/756 |
| 5,584,049 | A | * | 12/1996 | Weaver et al. ............. 455/67.11 |
| 5,659,322 | A | * | 8/1997 | Caille ......................... 342/188 |
| 5,742,201 | A | * | 4/1998 | Eisenberg et al. .............. 330/2 |
| 6,052,582 | A | * | 4/2000 | Blasing et al. ............ 455/562.1 |
| 6,181,920 | B1 | * | 1/2001 | Dent et al. ................... 455/101 |
| 6,703,974 | B2 | * | 3/2004 | White et al. ................ 342/361 |
| 6,828,932 | B1 | * | 12/2004 | Jenabi ......................... 342/188 |
| 6,946,990 | B2 | * | 9/2005 | Monk .......................... 342/174 |
| 7,023,278 | B1 | * | 4/2006 | Vagher et al. ............... 330/284 |
| 7,043,218 | B1 | * | 5/2006 | Ogino ...................... 455/277.2 |
| 7,098,859 | B2 | * | 8/2006 | Shimawaki et al. ... 343/781 CA |
| 2002/0002037 | A1 | * | 1/2002 | Ito et al. ...................... 455/101 |
| 2003/0162566 | A1 | * | 8/2003 | Shapira et al. .............. 455/561 |
| 2003/0174095 | A1 | * | 9/2003 | Sievenpiper ................. 343/770 |
| 2003/0179137 | A1 | * | 9/2003 | White et al. ................. 342/361 |
| 2004/0192395 | A1 | * | 9/2004 | Karabinis ................. 455/562.1 |
| 2006/0146581 | A1 | * | 7/2006 | Murphy ........................ 363/37 |
| 2008/0018545 | A1 | * | 1/2008 | Kaplan et al. ............... 343/713 |

OTHER PUBLICATIONS

Andrew Miceli; Fear of Interference—wireless networks; Feb. 23, 2005; http://www.findarticles.com/p/articles/mi_m0GTV/is_20_18/ai_79558564.

(Continued)

Primary Examiner—Duc Nguyen
Assistant Examiner—Dominic E Rego

(57) ABSTRACT

An antenna system for transferring wireless communication signals between a wireless communication device and a base station is provided. The system includes a first linear polarization antenna associated with a first signal, and a second linear polarization antenna associated with a second signal and oriented perpendicularly to the first antenna. The first and second antennas are coupled to a phase shifter through first and second signal attenuators configured to selectively attenuate the first and second signals, respectively. The phase shifter is also coupled with the base station, and is configured to delay the phase of the first signal by ninety degrees. In addition, an attenuator controller coupled with the first and second attenuators is configured to control when the first and second signal attenuators attenuate the first and second signals.

20 Claims, 6 Drawing Sheets

OTHER PUBLICATIONS

Frank M. Caimi, Ph.D.; MLA Antennas—Physically Small, Electrically Large; May 11, 2005: http://www.skycross.com/MLA_antenna.asp.

Skycross; Antenna Terminology; May 11, 2005; http://www.skycross.com/terminology.asp.

Globalspec; Applications; May 11, 2005; http://www.globalspec.com/help/spechelp.html?name=rf_antennas&comp=2762&sactionid=1.

Performance Tips—Circular Polarization; The Ultimate Guide to 11 Meter CB Antennas; Feb. 23, 2005; http://www.signalengineering.com/ultimate/circular_polarization.html.

* cited by examiner

BASE STATION ANTENNA SYSTEM EMPLOYING CIRCULAR POLARIZATION AND ANGULAR NOTCH FILTERING

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

Aspects of the invention relate generally to wireless communication networks, and more particularly to antennas transferring signals between wireless communication devices and base stations.

2. Description of the Prior Art

Wireless communication networks, such as Personal Communication Service (PCS) networks, provide wireless broadband digital voice, messaging and data services to mobile communication devices like cellular phones. Such a network typically employs multiple base transceiver stations (BTSes) to transmit radio frequency (RF) signals to, and receive signals from, the mobile devices. Often, the BTSes are geographically spaced apart so that each primarily serves a dedicated area, or "cell," within which each BTS provides communications between mobile devices within the cell and the remainder of the communications network.

Each cell is typically divided into "sectors," or radial sections of a predetermined angular width. For example, if a cell is apportioned into twelve sectors, each sector is essentially a pie-shaped wedge of thirty degrees in width so that the entire 360-degree circular area about the BTS may be serviced.

In many current PCS implementations, each sector is serviced by a pair of antennas: a first transmit/receive (Tx/Rx) antenna, and a receive-only (Rx-only) antenna. Therefore, two antennas are available to receive signals from wireless communication devices within the cell by way of channels termed upstream links. Similarly, transmission from the BTS to a communication device occurs via downstream links. The receiver antennas are normally separated by at least ten wavelengths of the signals employed in the upstream links to help provide a form of "receiver diversity." In other words, the two receiver antennas provide slightly different paths, and thus different upstream link characteristics, by which signals from the mobile devices may be received by the BTS. As a result, if the path to one of the antennas is obscured from direct line-of-sight with a mobile device, or if signal reflections from nearby buildings or other objects cause fading of the signal from the mobile device along one path, the other path is likely not affected to the same degree. Thus, this receiver diversity possibly allows communication between the BTS and the mobile device to proceed under a variety of circumstances.

Unfortunately, other problems may result which cannot be resolved by physical separation of the receiver antennas. For example, the Tx/Rx and Rx-only antennas are typically oriented in a fixed vertical position, which is the best orientation with which to receive the normally vertically-polarized signals transmitted from mobile devices, which are typically held in an upright position during use. However, other non-vertical signal polarizations result in a lower-strength signal being received by the antennas. In the worst case, a horizontally-polarized signal oriented perpendicularly to the vertically-oriented antennas will result in a loss in signal strength of 20 decibels (dB) or more as received by the antennas. Such signal loss can result in extreme reduction, or "deep fade," of the upstream signal, and even termination of current communications between the mobile device and the BTS, often termed a "dropped call." To counteract such a problem, signal transmission power in the mobile device may be increased, which ultimately results in reduced battery life in the mobile device. Also, reflections, refractions, and other modifications of the upstream signals due to various objects and environmental conditions can alter the polarization of the signals as well, resulting in the communication maladies mentioned above.

To combat problems involving polarization, some receiver antenna systems employ angular diversity, as opposed to the location diversity described above. In one example, each of a pair of linear antennas is tilted at 45 degrees from horizontal so that they cross each other, resulting in a pair of "slant-pole" receiver antennas. This particular configuration mitigates problems regarding a 20 dB loss due to cross-polarization, as no single polarization can be cross-polarized with both slant-pole antennas. However, significant signal strength losses due to polarization mismatches still occur, as such an antenna configuration only exhibits a kind of dual linear polarization.

In other communications systems, some receiver antenna systems employ the use of circular polarization, whereby wireless communication signals may be polarized in a rotating fashion, either mechanically or electronically, about a horizontal axis through all angular orientations. Such antenna systems are commonly employed in satellite communications, and have been proposed in conjunction with citizen's band (CB) radio and PCS communications. However, current circularly polarized receiver antenna systems typically treat all angular orientations equally, and thus do not readily distinguish between wanted communications and potential noise sources.

SUMMARY OF THE INVENTION

Embodiments of the invention, described below, provide an antenna system for transferring wireless communication signal between a wireless communication device and a base station, wherein the antenna employs circular polarization and angular notch filtering. In general, the antenna system includes a first linear polarization antenna associated with a first signal, and a second linear polarization antenna associated with a second signal and oriented perpendicularly to the first antenna. The first and second antennas are coupled to a phase shifter via first and second signal attenuators configured to selectively attenuate the first and second signals. The phase shifter is also coupled with the base station, and is configured to delay the phase of the first signal by ninety degrees. Further, an attenuator controller coupled with the first and second attenuators is configured to control the timing of the attenuation of the first and second signals via the first and second attenuators.

Additional embodiments and advantages of the present invention will be realized by those skilled in the art upon perusal of the following detailed description, taken in conjunction with the accompanying drawings.

DETAILED DESCRIPTION OF THE INVENTION

Figure 1:
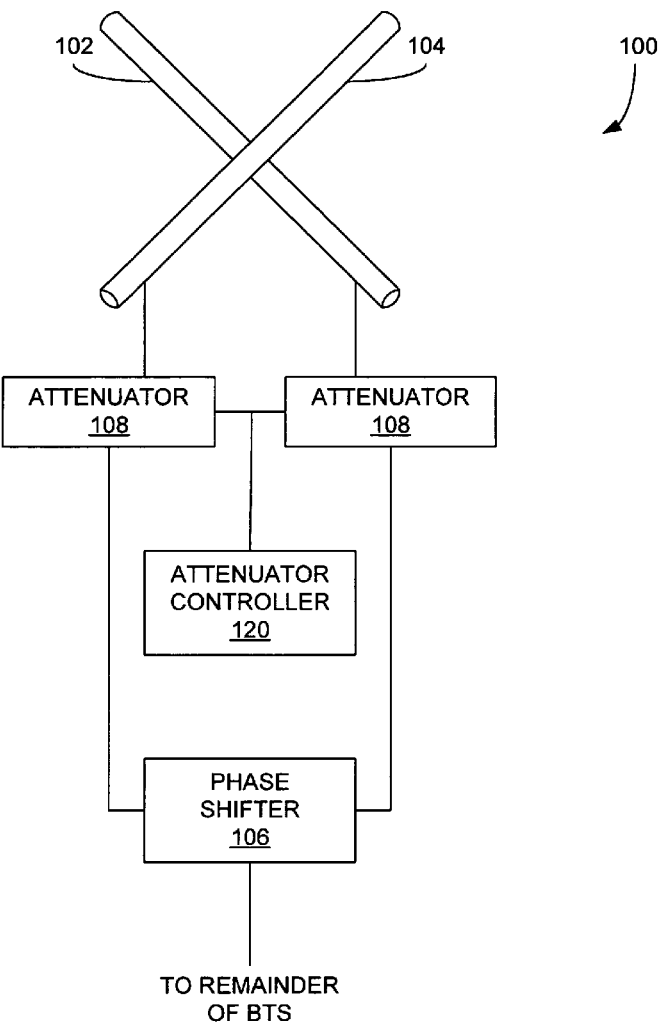
FIG. 1 is a block diagram of an antenna system according to an embodiment of the invention.

Embodiments of the invention, described below, provide a circularly-polarized antenna system for a base station that supplies angular notch filtering. FIG. 1 is a block diagram of one particular embodiment of the invention, an antenna system 100 for a base transceiver station (BTS). In a typical PCS or broadband wireless network arrangement, a BTS may employ several such antenna systems 100, nominally two per sector, to provide the necessary coverage for a cell area serviced by the BTS.

The remainder of the BTS coupled with the antenna system 100 may include wireless signal amplifiers, signal format and frequency converters for converting between wireless radio frequency (RF) signals and land-based telephony signals, power supplies for providing electrical power for the BTS, and other circuitry. Generally, the particular circuits or configuration of a BTS employing the antenna system 100 is not critical to understanding embodiments of the current invention, and hence are not discussed in detail herein.

While embodiments discussed below specifically involve BTSes for broadband or PCS wireless communications, other forms of wireless communication, such as amateur radio, public safety radio, citizen's band (CB) radio, satellite communications, and the like, may benefit from various aspects of the invention as set forth below. Thus, other embodiments of the invention not specifically disclosed herein may be employed in conjunction with a base station employing a particular communication format to transfer signals between a wireless communication device and the base station. In some embodiments, the wireless communication device may be a mobile device, or another base station.

In the particular example of FIG. 1, a first linear antenna 102 and a second linear antenna 104 are arranged in a cross-polar, or "slant-pole," configuration, whereby each of the antennas 102, 104 is oriented 45 degrees from vertical, and at 90 degrees relative to each other. In alternative embodiments, other orientations relative to the vertical or horizontal direction may also be employed, as long as the relative orientation between the antennas remains substantially perpendicular.

In one embodiment, the pair of linear antennas 102, 104 may be employed strictly for receiving wireless signals from a mobile communication device, such as a cell phone. In another embodiment, the linear antennas 102, 104 may be utilized only for transmission of wireless signals to a mobile device. Alternatively, the pair of antennas 102, 104 may be employed both as transmitter and receiver antennas.

Typically, each of the linear antennas 102, 104 exhibits a characteristic impedance of 50 ohms ($\Omega$). However, in alternative embodiments, other characteristic impedance values may be associated with the antennas 102, 104.

Operably coupled with each of the antennas 102, 104 is a phase shifter 106, which alters the relative phase of the signals received or transmitted by the antennas 102, 104 by 90 degrees. (A pair of signal attenuators 108, located between each of the antennas 102, 104 and the phase shifter 106, is described in greater detail below.) During transmission, the phase shift produced by the phase shifter 106 induces circular polarization of signals transmitted from the antennas 102, 104 to a wireless communication device. Similarly, during reception, the circular polarization allows the antennas 102, 104 to receive signals of varying linear polarizations equally well. Thus, horizontally-polarized signals from a wireless communication device will be received by the antennas 102, 104 with the same signal strength as vertically-polarized signals or other linearly polarized signals of varying orientation.

Figure 2A:
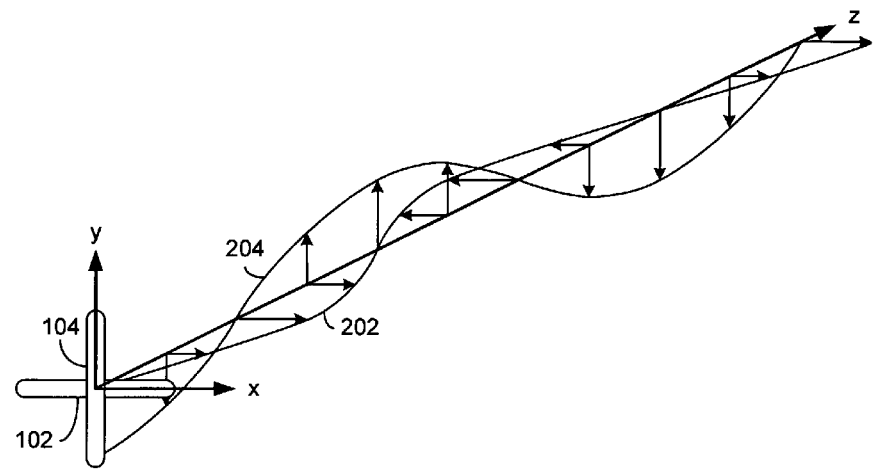
FIG. 2A is a perspective diagram of two linearly-polarized signals transmitted by the antenna system of FIG. 1 according to an embodiment of the invention, wherein a first signal from a first antenna leads a second signal from a second antenna by a phase differential of 90 degrees.
Figure 2B:
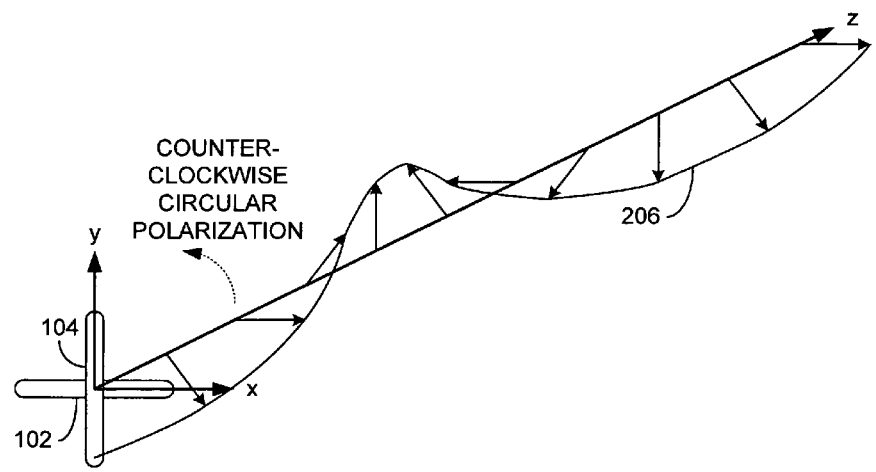
FIG. 2B is a perspective diagram of a counter-clockwise circularly-polarized signal produced by the two linearly-polarized signals of FIG. 2A.
Figure 2C:
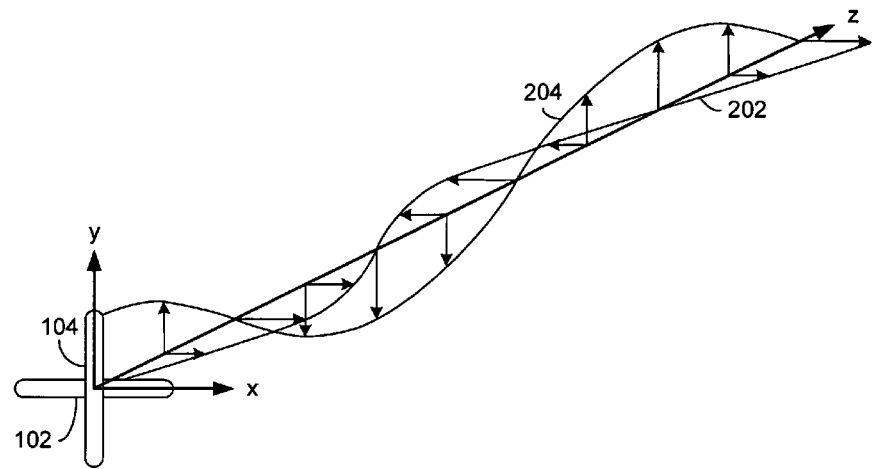
FIG. 2C is a perspective diagram of two linearly-polarized signals transmitted by the antenna system of FIG. 1 according to an embodiment of the invention, wherein a first signal from a first antenna lags a second signal from a second antenna by a phase differential of 90 degrees.
Figure 2D:
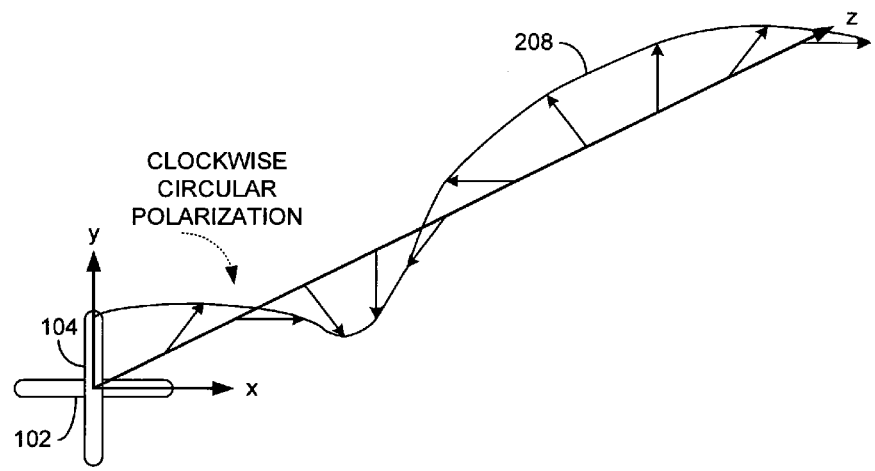
FIG. 2D is a perspective diagram of a clockwise circularly-polarized signal produced by the two linearly-polarized signals of FIG. 2C.

FIGS. 2A through 2D depict how the direction of the circular polarization of the antennas 102, 104 during transmission of a wireless signal depends on which antenna 102, 104 is transmitting the leading or lagging signal. In each of FIGS. 2A and 2C, the antennas 102, 104 are shown aligned along typical x- and y-axes, respectively, to simplify the rendering of the resulting signal waves. Accordingly, the first antenna 102 generates a first linearly-polarized signal 202 in the plane defined by the x-axis. Similarly, the second antenna 104 generates a second linearly-polarized signal 204 in the plane defined by the y-axis. Both signals 202 and 204 are represented as essentially sinusoidal, although other waveforms are also possible. In FIG. 2A, the signal 202 from the first antenna 102 leads the signal 204 from the second antenna 104 by 90 degrees. The combination of the signals 202, 204 of FIG. 2A results in a counter-clockwise, or left-hand, circularly-polarized signal 206, depicted in FIG. 2B. Oppositely, FIG. 2C shows the first antenna signal 202 lagging the second antenna signal 204 by 90 degrees. The combination of the signals 202, 204 of FIG. 2C thus produces a clockwise, or right-hand, circularly-polarized signal 208, as shown in FIG. 2D.

When antennas 102, 104 are employed to receive wireless signals from wireless communication devices, the circular polarization described above causes all linearly-polarized signals, such as those received from most mobile communication devices, such as cell phones, to be received at a substantially constant power level regardless of the orientation of the linearly-polarized signal being received. As a result, instances of cross-polarized signals resulting in 20 dB power loss of the received signal are essentially eliminated, thus potentially allowing the wireless communication devices serviced by the antenna system 100 to use less transmission power while experiencing fewer dropped calls. Thus, mobile device battery life is likely to be extended.

Generally, circular polarization of the antennas 102, 104 causes a 3 dB loss in signal power compared to a linearly-polarized signal that is aligned with a linear antenna. However, the antenna system 100 may compensate for such a signal loss in one embodiment by way of employing antennas 102, 104 possessing a net gain figure of 3 dB greater than that of a typical linear receiving antenna. For transmitting signals, transmission power may be increased to garner a 3 dB increase in signal strength. Other compensation methods in alternative embodiments include reducing cell coverage of the BTS associated with the antenna system 100 and employing more BTSes to service the same overall geographical area.

In the typical case that mobile communication devices each employ a linear antenna, the direction of circular polarization (clockwise or counter-clockwise) associated with the antenna system 100 is not critical. However, to reduce potential interference from signals transmitted by adjacent sectors of the BTS, or by a nearby BTS, circular polarization of differing senses among the various antenna systems 100 may be employed. For example, in one embodiment each antenna system 100 associated with every other sector of a particular cell may employ counter-clockwise circular polarization, while the remaining sectors may utilize clockwise polarization. In another embodiment, each of the sectors of a cell may employ counter-clockwise polarization, while all BTSes of geographically adjacent cells utilize clockwise polarization. Other arrangements of clockwise and counter-clockwise circular polarization may also be employed.

Figure 3:
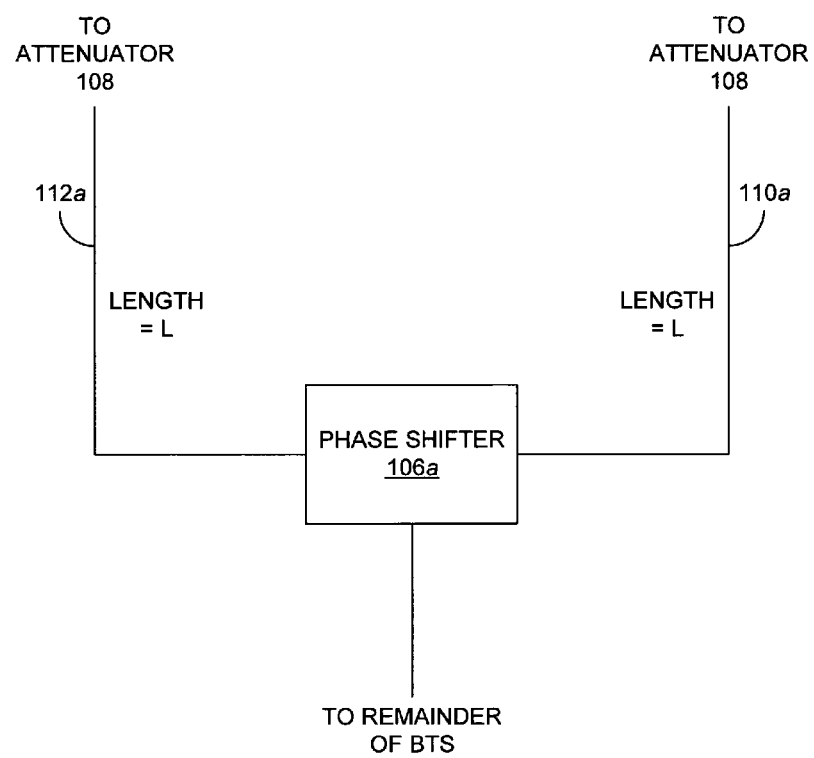
FIG. 3 is a first example of the phase shifter of FIG. 1 according to an embodiment of the invention.

The phase shifter 106 responsible for generating the circular polarization of the antenna system 100 may take one of several different forms. For example, the phase shifter 106 may be a digital or analog electronic circuit 106a shifting the phase of the signal 202 associated with the first antenna 102 by 90 degrees while leaving the phase of the signal 204 corresponding with the second antenna 104 unmodified. As shown in FIG. 3, such a phase shifter 106a is typically coupled with each of the antennas 102, 104 by way of a first coaxial cable 110a and a second coaxial cable 112a of substantially equal length L to limit any further phase shift. In one embodiment, each of the coaxial cables 110a, 112a exhibits a characteristic impedance that matches that of their corresponding antennas 102, 104 to limit unwanted signal reflections.

Figure 4:
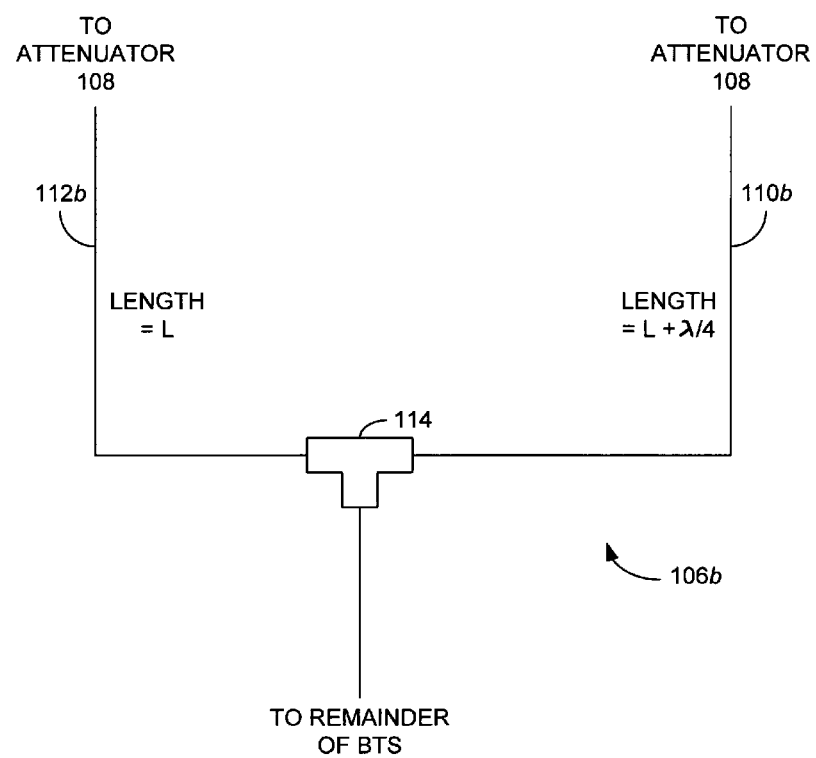
FIG. 4 is a second example of the phase shifter of FIG. 1 according to an embodiment of the invention.

In another embodiment, the phase shifter 106 may include a phase harness 106b coupling the antennas 102, 104 with the remainder of the BTS, as depicted in FIG. 4. The phase harness 106b accomplishes the 90-degree phase delay of one of the signals associated with the antennas 102, 104 by utilizing varying lengths of cable to provide the appropriate delay. In one embodiment, the phase harness includes two sections of coaxial cable 110b, 112b coupled by way of a T-connector 114 or similar coupling device to the remainder of the BTS. The two coaxial cables 110b, 112b differ in length by one-quarter of the wavelength λ of the signals transmitted and/or received by the antennas 102, 104, thus accomplishing the desired 90-degree phase shift to produce circular polarization. As shown in FIG. 4, the first cable 110b is one-quarter wavelength λ/4 longer than cable 112b. In one embodiment, each of the cables 110b, 112b exhibits a characteristic impedance of 100Ω so that the parallel combination of their impedances is 50Ω as viewed from the remainder of the BTS. In a further embodiment, the length L of the second cable 112b will be an integral multiple of the electrical wavelength λ of the RF signal, and the first cable 110b will be an integral multiple of the electrical wavelength λ of the RF signal, plus an additional one-quarter wavelength λ/4. Such characteristic impedances would thus match a standard 50Ω cable coupling the T-connector 114 of the phase harness 106b with the remainder of the BTS.

Figure 5A:
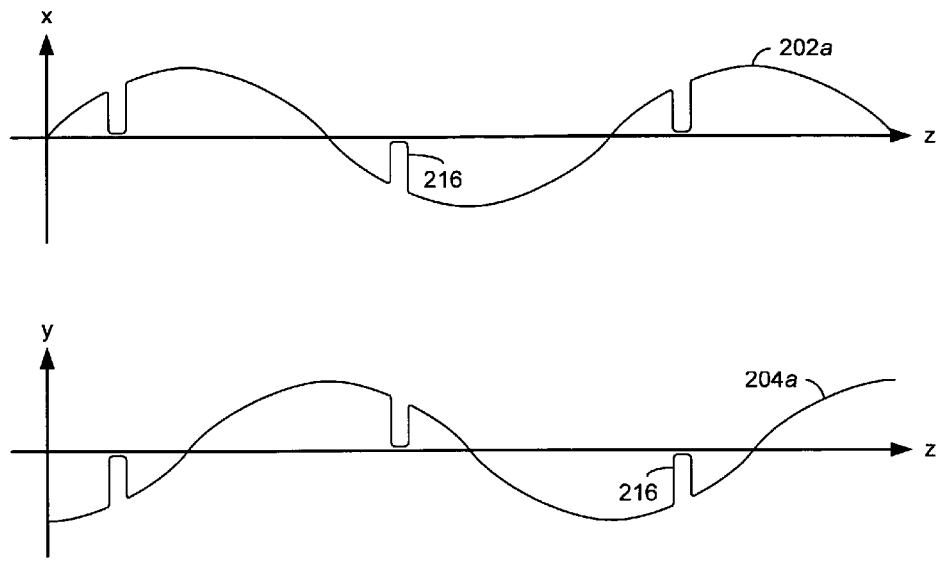
FIG. 5A is a timing diagram of signals transmitted from the first and second antennas of FIG. 1 according to an embodiment of the invention.

Located between each of antennas 102, 104 and the phase shifter 106 is a signal attenuator 108, mentioned above and shown in FIG. 1. Generally, each of the attenuators 108 simultaneously reduces or eliminates a signal 202a, 204a transmitted from each of the antennas 102, 104 during a particular portion of each signal period. FIG. 5A provides a simplified representation of the effect of the attenuators 108 on the signals 202a, 204a transmitted by the antennas 102, 104, as shown in FIG. 2A. In this particular example, the signal 202a transmitted by the antenna 102 is attenuated during a time period centered about one-quarter of a period into each half-cycle of the signal 202a. The signal 204a from antenna 104 is attenuated at essentially the same time. This attenuation results in the periodic reduction or elimination of the resulting circularly-polarized signal at a particular range of angles of polarization. This reduction or elimination is illustrated as a notch 216 in FIG. 5A. Given the attenuation timing shown for the signals 202a, 204a, the notch 216 appears in a resulting counter-clockwise circularly-polarized signal 206a transmitted from the antennas 102, 104 centered about the particular linear polarization at 45 degrees clockwise from the first antenna 102. A graphic representation of the resulting signal 206a, including the notch 216, is illustrated in conjunction with the antennas 102, 104 in FIG. 5B, in which the counter-clockwise sense of polarization is noted with arrows. As a result, vertically-oriented, linearly-polarized transmission signals would be reduced or eliminated in the notch 216 in this particular scenario.

Employing these same angular notch filtering principles, any particular linear orientation of a transmitted circularly-polarized signal 206 may be attenuated using the antenna system 100 to help reduce pilot pollution, interference, and other problems involving interaction between the transmitted signal 206 and other wireless signals. (Generally, pilot pollution is a type of interference involving receipt of signals by a mobile communication device from multiple BTSes, resulting in excess downstream link energy being received, thus producing a high noise floor and, consequently, a reduced signal-to-noise ratio.) Also, filtering of upstream wireless signals by the antennas 102, 104 reduces or eliminates received linearly-polarized signals whose polarities align with those being filtered, such as unwanted signals generated by other BTSes or wireless communication devices. In addition, other methods for reducing interference or pilot pollution, such as electronic or mechanical "down-tilting" of the antennas 102, 104 to reduce the area serviced by the BTS, may also be implemented in addition to the use of the attenuators 108.

Figure 5B:
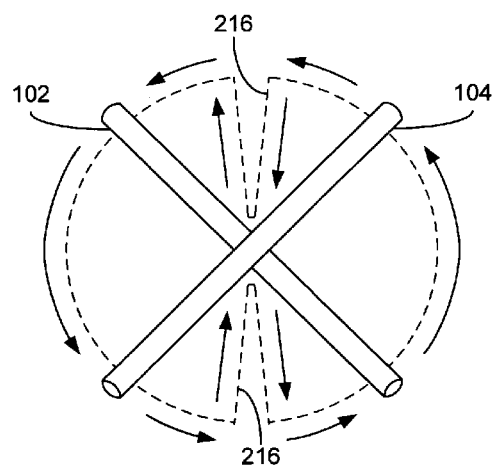
FIG. 5B is a graphical representation of a signal resulting from the combination of the signals of FIG. 5A shown in conjunction with the first and second antennas of FIG. 1 according to an embodiment of the invention.

In the embodiment indicated by FIGS. 5A and 5B, the transmitted signals 202a, 204a are each attenuated twice per period to limit or prevent signal transmission through a particular range of linear polarizations, as indicated by the notches 216. In other embodiments, more or fewer notches 316 may be created by the attenuators 108. For example, signals located in more than one range of linear polarization angles may be interfering with the antenna system 100, so twice that number of notches 216 may be generated by the attenuators 108. Oppositely, in locations or time periods where interference from other transmitted signals is not a concern, the attenuators 108 may not create any notches 216, thus allowing the circular polarization of the resulting transmitted signal to remain unaltered.

In one embodiment of the invention, the attenuators 108 may include electronic circuits, such as electronic switches, which selectively eliminate received or transmitted signals associated with the first and second antennas 102, 104, respectively. In another embodiment, the attenuators 108 may include circuits which reduce the level of the signals to a low power level compared to their normal amplitude. In a further embodiment, the attenuators 108 each exhibit a characteristic impedance of 50Ω to match that of the antennas 102, 104. In one embodiment, cables of equal electrical length and exhibiting a characteristic impedance of 50Ω are employed to couple each antenna 102, 104 with its corresponding attenuator 108.

In one embodiment, the attenuators 108 are controlled by an attenuator controller 120, which provides a control signal indicating when the attenuators 108 are to reduce or eliminate the signals associated with the antennas 102, 104. In one embodiment, the attenuator controller 120 may include an electronic circuit synchronized with the signals transmitted or received by the antennas 102, 104, and configured to activate the control signal during transmitted and/or received signal linear polarizations which are associated with interference from other electromagnetic signal or noise sources, such as out-of-sector mobile communication devices. Such interference may be detected by the attenuator controller 120, another electronic circuit within the BTS coupled with the antenna system 100, or another separate electronic circuit.

In a further embodiment, the attenuator controller 120 may include a processor configured to execute instructions in software for determining when the attenuators 108 should be activated to reduce or eliminate the signals associated with the antennas 102, 104. The determination to reduce or eliminate the signals could be based on information relating to previous signals being transmitted or received by the antennas 102, 104, such as previously detected interference, previously dropped calls, and the particular signal polarization associated therewith. For example, information related to repeated interference detected in signals received by the antennas 102, 104 during a particular angular portion of the circular polarization produced by the antenna system 100 may be employed by instructions executing on a processor of the attenuator controller 120 to actuate the attenuators 108 during that particular range of angles.

While several embodiments of the invention have been discussed herein, other embodiments encompassed within the scope of the invention are possible. For example, while the specific environments discussed herein in conjunction with the antenna system 100 are PCS and broadband wireless communications, other wireless communication systems, including, but not limited to, satellite communications, amateur radio communications, public safety radio communications, and citizen's band radio communications, may benefit from the application of various aspects of the invention as set forth above. Also, aspects of one embodiment may be combined with aspects of other embodiments disclosed above to produce additional embodiments not heretofore discussed. Thus, while the present invention has been described in the context of specific embodiments, such descriptions are provided for illustration and not limitation. Accordingly, the proper scope of the present invention is delimited only by the following claims.

What is claimed is:

1. An antenna system for transferring wireless communication signals between a wireless communication device and a base station, the antenna system comprising:
   a first linear polarization antenna;
   a second linear polarization antenna oriented perpendicularly to the first linear polarization antenna;
   a first signal attenuator coupled with the first linear polarization antenna, the first signal attenuator configured to selectively attenuate a first signal associated with the first linear polarization antenna;
   a second signal attenuator coupled with the second linear polarization antenna, the second signal attenuator configured to selectively attenuate a second signal associated with the second linear polarization antenna;
   a phase shifter coupled with the first and second signal attenuators and the base station, wherein the phase shifter is configured to induce a 90-degree phase delay in the first signal to generate circular polarization for the antenna system, wherein the phase shifter exhibits a characteristic impedance of 50 ohms;
   an attenuator controller coupled with the first and second signal attenuators, the attenuator controller configured to control when the first and second signal attenuators attenuate the first signal and the second signal to form a notch in the circular polarization at a range of polarization angles;
   a first cable coupling the phase shifter with the first signal attenuator, the first cable exhibiting a characteristic impedance of 50 ohms, the first cable comprising a length;
   a second cable coupling the phase shifter with the second signal attenuator, the second cable exhibiting a characteristic impedance of 50 ohms, the second cable comprising a length substantially equal to the length of the first cable; and
   a third cable coupling the phase shifter with the base station, the third cable exhibiting a characteristic impedance of 50 ohms.

2. The antenna system of claim 1, wherein the first linear polarization antenna and the second linear polarization antenna each exhibit a characteristic impedance of 50 ohms.

3. The antenna system of claim 1, wherein the first signal attenuator and the second signal attenuator each exhibit a characteristic impedance of 50 ohms.

4. The antenna system of claim 1, wherein the first signal attenuator and the second signal attenuator each comprise an electronic switch configured to selectively eliminate the first and second signals.

5. The antenna system of claim 1, wherein the first signal attenuator and the second signal attenuator each comprise an electronic circuit configured to reduce the power of the first and second signals.

6. The antenna system of claim 1, the phase shifter comprising an electronic circuit.

7. The antenna system of claim 1, the attenuator controller comprising an electronic circuit synchronized with the first signal and the second signal, the attenuator controller configured to selectively activate the first and second signal attenuators during periods of time associated with interference from other electromagnetic sources.

8. The antenna system of claim 7, the attenuator controller further comprising a processor configured to execute instructions for determining the periods of time associated with the interference from the other electromagnetic sources.

9. The antenna system of claim 8, the periods of time being determined from previously detected interference, and signal polarization associated therewith.

10. The antenna system of claim 8, the periods of time being determined from previously dropped calls, and signal polarization associated therewith.

11. The antenna system of claim 1, wherein the first signal and the second signal are linearly-polarized transmission signals combined to produce a clockwise circularly-polarized transmission signal to the wireless communication device.

12. The antenna system of claim 1, wherein the first signal and the second signal are linearly-polarized transmission signals combined to produce a counter-clockwise circularly-polarized transmission signal to the wireless communication device.

13. The antenna system of claim 1, wherein the first signal and the second signal are linearly-polarized signals received by the first linear polarization antenna and the second linear polarization antenna from the wireless communication device.

14. An antenna system for transferring wireless communication signals between a wireless communication device and a base station, the antenna system comprising:
   a first linear polarization antenna;
   a second linear polarization antenna oriented perpendicularly to the first linear polarization antenna;
   a first signal attenuator coupled with the first linear polarization antenna, the first signal attenuator configured to selectively attenuate a first signal associated with the first linear polarization antenna;
   a second signal attenuator coupled with the second linear polarization antenna, the second signal attenuator configured to selectively attenuate a second signal associated with the second linear polarization antenna;
   a phase shifter coupled with the first and second signal attenuators and the base station, wherein the phase shifter is configured to induce a 90-degree phase delay in the first signal to generate circular polarization for the antenna system, and wherein the phase shifter comprises a phase harness;
   an attenuator controller coupled with the first and second signal attenuators, the attenuator controller configured to control when the first and second signal attenuators attenuate the first signal and the second signal to form a notch in the circular polarization at a range of polarization angles;
   wherein the phase harness comprises:
   a T-connector;
   a first cable coupling the T-connector with the first signal attenuator, the first cable comprising a length of an integral multiple of an electrical wavelength of the first signal and the second signal, plus one-quarter of the electrical wavelength of the first signal and the second signal; and
   a second cable coupling the T-connector with the second signal attenuator, the second cable comprising a length of the integral multiple of the electrical wavelength of the first signal and the second signal; and
   wherein the antenna system further comprises a third cable coupling the T-connector with the base station.

15. The antenna system of claim 14, wherein each of the first cable and the second cable comprise coaxial cable exhibiting a characteristic impedance of 100 ohms, and wherein the third cable comprises coaxial cable exhibiting a characteristic impedance of 50 ohms.

16. The antenna system of claim 14, the attenuator controller comprising an electronic circuit synchronized with the first signal and the second signal, the attenuator controller configured to selectively activate the first and second signal attenuators during periods of time associated with interference from other electromagnetic sources.

17. The antenna system of claim 16, the attenuator controller further comprising a processor configured to execute instructions for determining the periods of time associated with the interference from the other electromagnetic sources.

18. A base station comprising an antenna system for transferring wireless communication signals between a wireless communication device and the base station, the antenna system comprising:
   a first linear polarization antenna;
   a second linear polarization antenna oriented perpendicularly to the first linear polarization antenna;
   a first signal attenuator coupled with the first linear polarization antenna, the first signal attenuator configured to selectively attenuate a first signal associated with the first linear polarization antenna;
   a second signal attenuator coupled with the second linear polarization antenna, the second signal attenuator configured to selectively attenuate a second signal associated with the second linear polarization antenna;
   a phase shifter coupled with the first and second signal attenuators and the base station, wherein the phase shifter is configured to induce a 90-degree phase delay in the first signal; and
   an attenuator controller coupled with the first and second signal attenuators, the attenuator controller configured to control when the first and second signal attenuators attenuate the first signal and the second signal; wherein the attenuator controller comprises an electronic circuit synchronized with the first signal and the second signal, and wherein the attenuator controller is configured to selectively activate the first and second signal attenuators during periods of time associated with interference from other electromagnetic sources.

19. A wireless communication network comprising the base station of claim 18.

20. The wireless communication network of claim 19, wherein the base station is a base transceiver station for broadband wireless communication.

* * * * *

UNITED STATES PATENT AND TRADEMARK OFFICE
CERTIFICATE OF CORRECTION

PATENT NO.       : 7,593,753 B1               Page 1 of 1
APPLICATION NO.  : 11/184700
DATED            : September 22, 2009
INVENTOR(S)      : Walter F. Rausch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this

Twenty-eighth Day of September, 2010

David J. Kappos
*Director of the United States Patent and Trademark Office*